US009389605B2

(12) United States Patent
Matsuura et al.

(10) Patent No.: US 9,389,605 B2
(45) Date of Patent: Jul. 12, 2016

(54) METHOD OF GENERATING A NUMERICAL CONTROL PROGRAM, APPARATUS FOR THE SAME, AND PROGRAM FOR CAUSING A COMPUTER TO EXECUTE THE METHOD

(75) Inventors: Mahito Matsuura, Tokyo (JP); Takashi Kamiya, Tokyo (JP); Nobuyuki Takahashi, Tokyo (JP); Susumu Matsubara, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 891 days.

(21) Appl. No.: 13/698,899

(22) PCT Filed: May 20, 2010

(86) PCT No.: PCT/JP2010/003395
§ 371 (c)(1),
(2), (4) Date: Nov. 19, 2012

(87) PCT Pub. No.: WO2011/145144
PCT Pub. Date: Nov. 24, 2011

(65) Prior Publication Data
US 2013/0066457 A1    Mar. 14, 2013

(51) Int. Cl.
*G06F 19/00* (2011.01)
*G05B 19/4097* (2006.01)

(52) U.S. Cl.
CPC .. *G05B 19/4097* (2013.01); *G05B 2219/35118* (2013.01)

(58) Field of Classification Search
CPC ............... G05B 19/4097; G05B 2219/35118
USPC ....................................................... 700/117
See application file for complete search history.

(56) References Cited

U.S. PATENT DOCUMENTS 4,832,541 A * 5/1989 Noguchi ............... B32B 27/045
407/114

(Continued)

FOREIGN PATENT DOCUMENTS

| JP | 1316805 A | 12/1989 |
| JP | 04256548 A | 9/1992 |
| JP | 08263114 A | 10/1996 |
| JP | 2003241809 A | 8/2003 |
| JP | 200544348 A | 2/2005 |
| JP | 2006172402 A * | 6/2006 |

OTHER PUBLICATIONS

Fabry "The Tool Channel" from "Cutting Tool Engineering", Oct. 2003/ vol. 55.*

(Continued)

*Primary Examiner* — Mohammad Ali
*Assistant Examiner* — Yuhui R Pan
(74) *Attorney, Agent, or Firm* — Sughrue Mion, PLLC

(57) ABSTRACT

In a method of generating a numerical control program in which, based on sectional shape data of a product to which a relief processing is to be performed, a numerical control program for turning-processing the product is generated in order to recognize a groove shape data existing in the vicinity of a corner as a relief sectional shape, wherein groove shape data is extracted from the sectional shape data, an intersection of a line segment parallel to a turning axis and a line segment that is not parallel to the line segment is calculated as a corner of the sectional shape data, and the groove shape data is recognized as a relief sectional shape in a case where dimensions of a frame which includes from the corner to the groove shape data are within predetermined dimensions.

11 Claims, 13 Drawing Sheets

(56) References Cited

U.S. PATENT DOCUMENTS

| | | | | |
|---|---|---|---|---|
| 5,286,069 | A | * | 2/1994 | Wilson .................... F16L 13/04 285/114 |
| 2003/0158621 | A1 | | 8/2003 | Matsubara et al. |
| 2006/0058908 | A1 | | 3/2006 | Kamiya et al. |
| 2006/0247804 | A1 | | 11/2006 | Kamiya et al. |
| 2006/0259181 | A1 | | 11/2006 | Kamiya et al. |
| 2007/0027571 | A1 | | 2/2007 | Kamiya et al. |
| 2007/0185607 | A1 | | 8/2007 | Kamiya et al. |

OTHER PUBLICATIONS

Office Action, Issued by the State Intellectual Property Office of P.R. China, Dated Sep. 4, 2014, in counterpart Chinese Application No. 201080066905.9.

International Search Report (PCT/ISA/210) dated Aug. 10, 2010 issued by the International Searching Authority in counterpart International Application No. PCT/JP2010/003395.

* cited by examiner (a)

(b)

(c)

(d)

(e)

(f)

(g)

(h)

(i)

METHOD OF GENERATING A NUMERICAL CONTROL PROGRAM, APPARATUS FOR THE SAME, AND PROGRAM FOR CAUSING A COMPUTER TO EXECUTE THE METHOD

TECHNICAL FIELD

The present invention relates to a method of generating a numerical control program, in which a numerical control program for operating a machine tool is generated from data such as a shape of a processing area, a process method, a tool to be used and processing conditions, an apparatus for the same, and a program for causing a computer to execute the method.

BACKGROUND ART

As an apparatus for producing a numerical control program for detecting the existence or non-existence of a groove-like turning sectional shape to which a turning-processing is to be performed from one-quarter sectional shape data, in which a plane containing the turning axis of a product shape model is set as a cross section, and turning-processing the detected turning sectional shape, conventionally, there is known an apparatus including a unit for determining the turning sectional shape to be a relief sectional shape in a case where the width and depth of the turning sectional shape are equal to or smaller than a predetermined relief parameter and the turning sectional shape exists in a perpendicular corner. Also an apparatus for producing a numerical control program for turning-processing a relief with a turning tool bit is known (see Patent Reference 1).

The relief is also called a clearance. The relief is a type of a groove shape which is provided to a part for various objects such as that parts becomes in close contact with each other without a gap therebetween, concentrated stress is relieved, and a portion that is not turning-processed is prevented from being formed at a corner (because the edge of a tool bit is rounded). A relief is processed by a turning tool bit such as shown in FIG. 3(a).

PRIOR ART REFERENCE

Patent Reference

Patent Reference 1: JP-A-2006-172402

DISCLOSURE OF THE INVENTION

Problems that the Invention is to Solve

However, in such an apparatus for generating a numerical control program, a condition for determining a relief sectional shape is that groove shape data is adjacent to a corner as shown in FIGS. 10(a) and (b). Therefore, in a case where a relief sectional shape is modeled while being deviated from a corner as shown in FIGS. 10(d), (e), and (f), the shape is determined that it is a groove shape to be processed by a groove tool bit such as shown in FIG. 3(b). However, regarding such a shape, since it is often intended that a relief processing is to be performed instead of a groove processing using a groove tool bit, process must be performed after tool exchange from a turning tool bit to a groove tool bit, and hence processing efficiency is lowered.

Further, in the above-described apparatus for generating a numerical control program, in a case where a processing program is produced from a relief sectional shape, the existence of a relief sectional shape with respect to a corner is only set as a flag, and one kind of processing program for cutting a corner into a groove-like shape is output as a relief processing program. Therefore, in a case where a relief processing program which is automatically produced is different from a product shape model, it is necessary to manually correct the program.

The invention has been made in order to solve the problems, and provides a method of generating a numerical control program in which, even in a case where a relief is placed at a position which is slightly deviated from a corner, the relief can be recognized as a relief sectional shape, an apparatus for the same, and a program for causing a computer to execute the method.

The invention further provides a method of generating a numerical control program which can produce a relief processing program according to a relief shape or a relief position, an apparatus for the same, and a program for causing a computer to execute the method.

Means for Solving the Problems

In order to accomplish the above-described object, a method of generating a numerical control program of the present invention is a method of generating a numerical control program in which, based on sectional shape data of a product to which a relief processing is to be performed, a numerical control program for turning-processing the product is generated, the method including: extracting groove shape data from the sectional shape data; calculating an intersection of a line segment parallel to a turning axis and a line segment that is not parallel to the line segment as a corner of the sectional shape data; and recognizing the groove shape data as a relief sectional shape in a case where dimensions of a frame which includes from the corner to the groove shape data are within predetermined dimensions.

Further, in the method of generating a numerical control of the present invention, a relief shape pattern is determined with respect to the recognized relief sectional shape.

Further, in the method of generating a numerical control of the present invention, the relief shape pattern includes a shape pattern in which a line segment configuring a groove shape is connected to the line segment parallel to the turning axis, a shape pattern in which a line segment configuring a groove shape is connected to the line segment that is not parallel to the line segment parallel to the turning axis, and a shape pattern in which a line segment configuring a groove shape is connected to the line segment parallel to the turning axis and the line segment that is not parallel to the line segment parallel to the turning axis.

Further, in the method of generating a numerical control of the present invention, the determination of the relief shape pattern is performed based on a positional relationship of the relief sectional shape with respect to the corner of the sectional shape data.

Further, in the method of generating a numerical control of the present invention, the determination of the relief shape pattern is performed based on a direction of a vector perpendicular to an in-material additional straight line segment that closes the relief sectional shape.

Further, in the method of generating a numerical control of the present invention, a relief processing program corresponding to the determined relief shape pattern is generated.

Further, an apparatus for generating a numerical control program of the present invention is an apparatus for generating a numerical control program which, based on sectional shape data of a product to which a relief processing is to be performed, generates a numerical control program for turning-processing the product, the apparatus including: a relief shape determining unit which extracts groove shape data from the sectional shape data and which recognizes the extracted groove shape data that exists in a vicinity of a corner of the sectional shape data as a relief sectional shape.

Further, in the apparatus for generating a numerical control program of the present invention, the relief shape determining unit calculates an intersection of a line segment parallel to a turning axis and a line segment that is not parallel to the line segment as the corner of the sectional shape data, and recognizes the groove shape data as the relief sectional shape in a case where dimensions of a frame which includes from the corner to the groove shape data are within predetermined dimensions.

Further, in the apparatus for generating a numerical control program of the present invention, the apparatus includes a relief shape pattern determining unit which determines a relief shape pattern with respect to the recognized relief sectional shape.

Further, in the apparatus for generating a numerical control program of the present invention, the relief shape pattern includes a shape pattern in which a line segment configuring a groove shape is connected to the line segment parallel to the turning axis, a shape pattern in which a line segment configuring a groove shape is connected to the line segment that is not parallel to the line segment parallel to the turning axis, and a shape pattern in which a line segment configuring a groove shape is connected to the line segment parallel to the turning axis and the line segment that is not parallel to the line segment parallel to the turning axis.

Further, in the apparatus for generating a numerical control program of the present invention, the relief shape pattern determining unit determines the relief shape pattern from a positional relationship of the relief sectional shape with respect to the corner of the sectional shape data.

Further, in the apparatus for generating a numerical control program of the present invention, the relief shape pattern determining unit determines the relief shape pattern from a direction of a vector perpendicular to an in-material additional straight line segment that closes the relief sectional shape.

Further, in the apparatus for generating a numerical control program of the present invention, the apparatus includes a relief processing program producing unit which generates a relief processing program corresponding to the relief shape pattern that is determined by the relief shape pattern determining unit.

Effects of the Invention

According to the invention, groove shape data which cannot be conventionally recognized as a relief, and which exist in the vicinity of a corner can be recognized as a relief sectional shape.

Moreover, a program according to the relief shape pattern can be output as a numerical control program for relief processing. Therefore, a process according to the relief shape can be performed.

BEST MODE FOR CARRYING OUT THE INVENTION

Embodiment 1

Hereinafter, Embodiment 1 of the invention will be described with reference to FIGS. 1 to 14.

Figure 1:
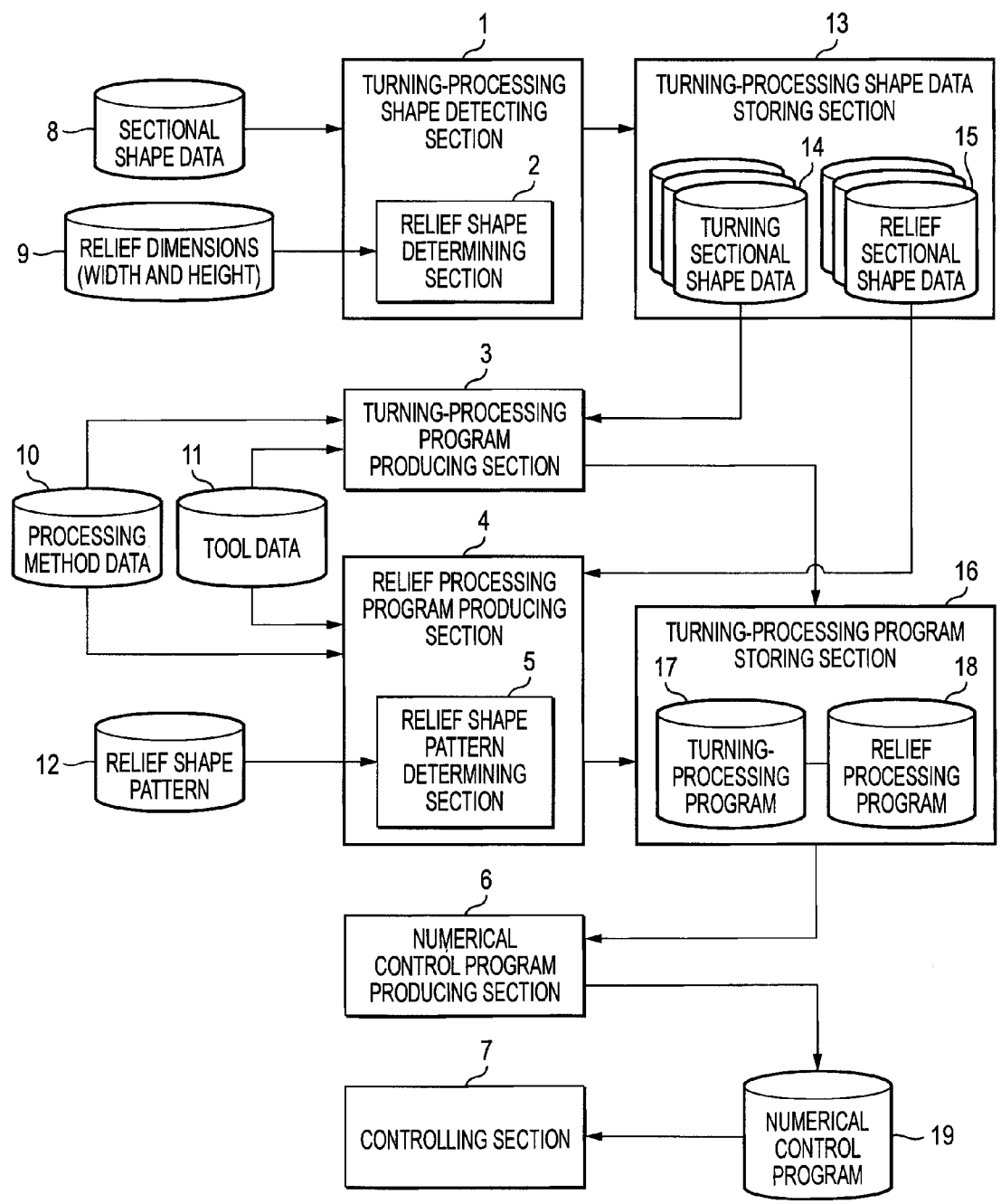
FIG. 1 is a configuration diagram of an apparatus for generating a numerical control program according to Embodiment 1 of the invention.

FIG. 1 shows the configuration of an apparatus for generating a numerical control program according to Embodiment 1 of the invention.

Referring to FIG. 1, a turning-processing shape detecting section (turning-processing shape detecting unit) 1 detects a processing area (a turning outer diameter, a turning profile groove, a turning inner diameter, a turning end surface, and the like) where the same tool bit can perform processing, from sectional shape data 8 of a product shape model stored in a sectional shape data storing section, divides into respective processing areas, and stores in a turning-processing shape data storing section 13 as turning sectional shape data 14.

In a relief shape determining section (relief shape determining unit) 2, when the turning sectional shape data 14 are to be detected, relief sectional shape data 15 are detected by using a rectangular frame having predetermined relief dimensions (for example, a frame having a width and height of 3 mm) stored in a relief dimension storing section, and the relief sectional shape data 15 are stored in the turning-processing shape data storing section 13 while being separated from the turning sectional shape data 14. The operation of the relief shape determining section 2 will be described in detail later.

A turning-processing program producing section (turning-processing program producing unit) 3 generates a turning-processing program (numerical control program) 17 based on processing method data 10 stored in a processing method data storing section and tool data 11 stored in a tool data storing section, with respect to the turning sectional shape data 14 stored in the turning-processing shape data storing section 13, and stores the turning-processing program 17 in a turning-processing program storing section 16. The processing method data 10 are data for performing the process expansion processing disclosed, for example, in Paragraph number 0139 and subsequent paragraphs of JP-A-2005-44348 issued in Japan, and data for breaking down a series of processing operations including turning-processing, point processing, surface processing, chamfering, and the like, into processing units in which continuous processing is performed with the same main spindle and the same tool.

In a case where the relief sectional shape data 15 is stored in the turning-processing shape data storing section 13, a relief processing program producing section (relief processing program producing unit) 4 determines into which one of relief shape patterns 12 stored in a relief shape pattern storing section the relief sectional shape data 15 is classified relief by a shape pattern determining section (relief shape pattern determining unit) 5 (see FIG. 12(j)). The relief processing program producing section (relief processing program producing unit) 4 generates a relief processing program (numerical control program) 18 based on the determined relief shape pattern 12, the processing method data 10, and the tool data 11, and stores the relief processing program 18 in the turning-processing program storing section 16. At this time, the storing is performed while adding a processing program number of the turning-processing program 17 to the relief processing program 18.

The storing of the relief processing program 18 while adding the processing program number of the turning-processing program 17 is performed such that the relief processing program 18 is incorporated into a part of the turning-processing program 17 for processing a corner where a relief sectional shape exists, and a relief is enabled to be processed by the same tool bit as the turning tool bit shown in FIG. 3(a) which performs a usual turning operation. For example, in a case where a relief is to be processed, when the turning-processing program 17 and the relief processing program 18 are not correlated with each other (when the processing program number of the turning-processing program 17 is not added to the relief processing program 18), after processing of (1)→(2) is performed by the turning-processing program 17 as shown in FIG. 13(a), processing of (3) (4)→(5) must be performed by the relief processing program 18. When correlated with each other, by contrast, processing of (1)→(2)→(3)→(4) can be continuously performed by the same tool bit as shown in FIG. 13(b), so that a turning-processing can be efficiently performed.

A numerical control program producing section (numerical control program generating unit) 6 produces a numerical control program 19 in consideration of the processing sequence, with respect to the programs stored in the turning-processing program storing section 16.

When the turning-processing program 17 and the relief processing program 18 are correlated with each other (when the processing program number of the turning-processing program 17 is added to the relief processing program 18), the numerical control program is generated in consideration of the processing sequence so that, during cutting of a corner in the turning-processing program 17, cutting in the relief processing program 18 is performed. Namely, the numerical control program 19 is generated so that a turning-processing is not performed in the sequence such as shown in FIG. 13(a), but performed in the sequence such as shown in FIG. 13(b) and with the same tool bit. The numerical control program 19 is stored in a numerical control program storing section.

A controlling section (controlling unit) 7 analyzes the numerical control program 19, produces tool cutting processing paths for performing processing operations, and controls a machine tool.

The hardware configuration of the apparatus for generating a numerical control program is similar to the configuration of a usual apparatus for generating a numerical control program configured by a CPU, memories, and the like. The turning-processing shape detecting section 1, the relief shape determining section 2, the turning-processing program producing section 3, the relief processing program producing section 4, the relief shape pattern determining section 5, the numerical control program producing section 6, and the like are configured by software.

Embodiment 1 is an example in which the apparatus for generating a numerical control program is structured on a numerical control apparatus. Alternatively, the apparatus may be sometimes structured on a personal computer. In a case where the apparatus is structured on a personal computer, the controlling section 7 does not exist in the personal computer, and therefore the numerical control program 19 is transferred to the controlling section 7 of a numerical control apparatus through an external memory and a network.

Figure 4:
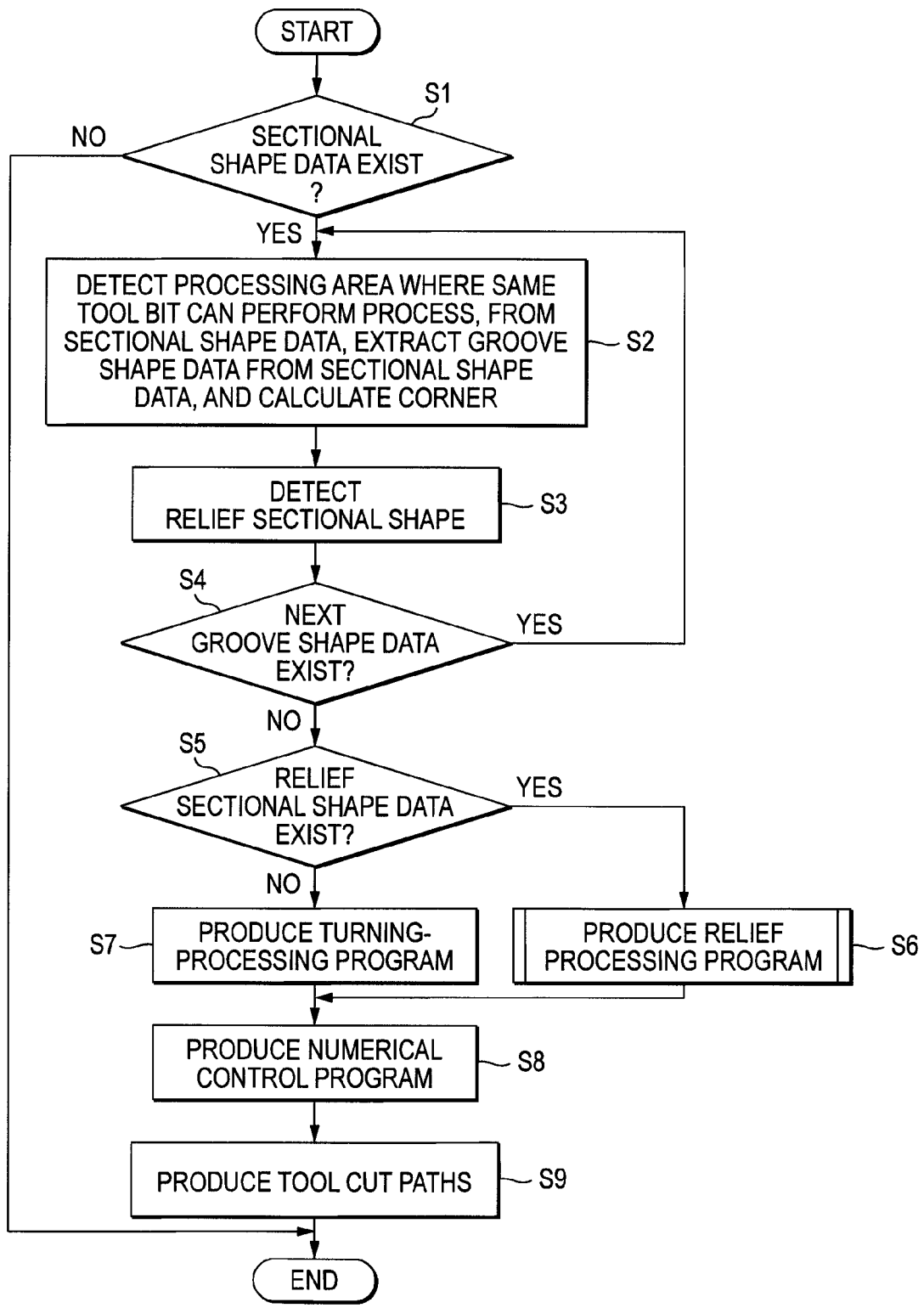
FIG. 4 is a flowchart showing the operation of the apparatus for generating a numerical control program of Embodiment 1 of the invention.

The thus configured apparatus for generating a numerical control program operates in accordance with the flowchart shown in FIG. 4.

Figure 2:
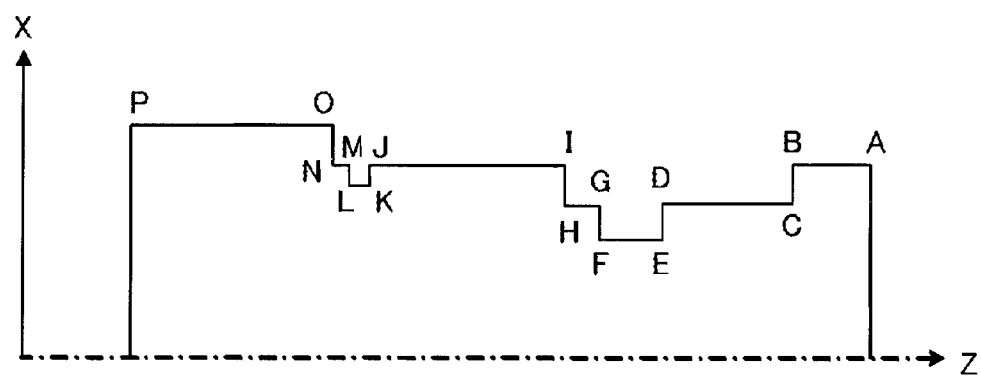
FIG. 2 is a view showing an example of a turning sectional shape according to Embodiment 1 of the invention.
Figure 3:
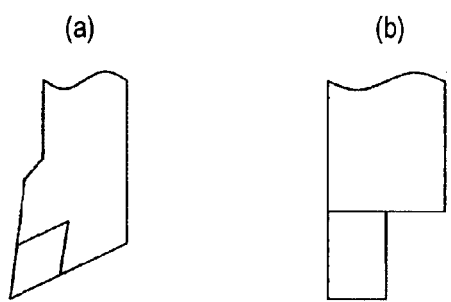
FIG. 3 is a view showing an example of a turning tool bit and a groove tool bit according to Embodiment 1 of the invention.

In step S1, the turning-processing shape detecting section 1 checks whether sectional shape data shown in, for example, FIG. 2 exists or not. If it does not exist, the process is ended, and otherwise, the process proceeds to step S2.

In step S2, the turning-processing shape detecting section 1 detects the processing area (the turning outer diameter, the turning profile groove, the turning inner diameter, the turning end surface, and the like) where the same tool bit can perform processing from the sectional shape data 8 of the product shape model stored in the sectional shape data storing section, divides into respective processing areas, and stores in the turning-processing shape data storing section 13 as the turning sectional shape data 14.

As the method of detecting the processing area where the same tool bit can perform processing, from the sectional shape data 8 of the product shape model, for example, the same method as the process expansion processing disclosed in Paragraph number 0138 and subsequent paragraphs of JP-A-2005-44348 issued in Japan may be used. In a case where the sectional shape data 8 of the product shape model are as shown in FIG. 2, for example, areas other than the groove in the location of DEFG and the groove (relief) in the location of JKLM constitute the turning sectional shape data 14 which can be processed by the same tool bit. In these areas, for example, processing is performed by a turning tool bit such as shown in FIG. 3(a). Also the groove in the location of DEFG constitutes the turning sectional shape data 14. However, this location is an area where processing is performed by a groove tool bit such as shown in FIG. 3(b), and therefore stored as turning sectional shape data which are different from those in which processing is performed by the turning tool bit.

The groove (relief) in the location of JKLM is processed by the turning tool bit, and, as described later, stored as the relief sectional shape data 15 in the turning-processing shape data storing section 13, independently from the turning sectional shape data 14.

In step S2, when the turning-processing shape detecting section 1 detects the turning sectional shape data 14 from the sectional shape data 8, the relief shape determining section 2 extracts groove shape data, and calculates a corner in the groove shape data.

As a method of checking whether groove shape data exist or not, for example, a method of extracting a concave shape disclosed in JP-A-2006-172402 issued in Japan may be used. In FIG. 2, the concave shape parts in the locations of DEFG, JKLM are recognized as a groove shape. Groove shapes include a groove shape (relatively shallow groove) in which a ratio of the width and the depth in the axial direction of a product is smaller than a predetermined value, a groove shape (relatively deep groove) in which the ratio is equal to or larger than the predetermined value, and a relief groove (clearance groove). Considering the processing efficiency, processability, and the like, a groove in which the ratio of the width and the depth in the axial direction of a product is smaller than the predetermined value and a relief groove are processed by a turning tool bit such as shown in FIG. 3(a), and a groove in which the ratio is equal to or larger than the predetermined value is processed by a groove tool bit such as shown in FIG. 3(b). In the shape shown in FIG. 2, the location of DEFG is processed by a groove tool bit such as shown in FIG. 3(b) and the other location is processed by a turning tool bit such as shown in FIG. 3(a).

The corner in the extracted groove shape data is calculated in a manner shown in FIGS. 5 to 8.

Figure 5:
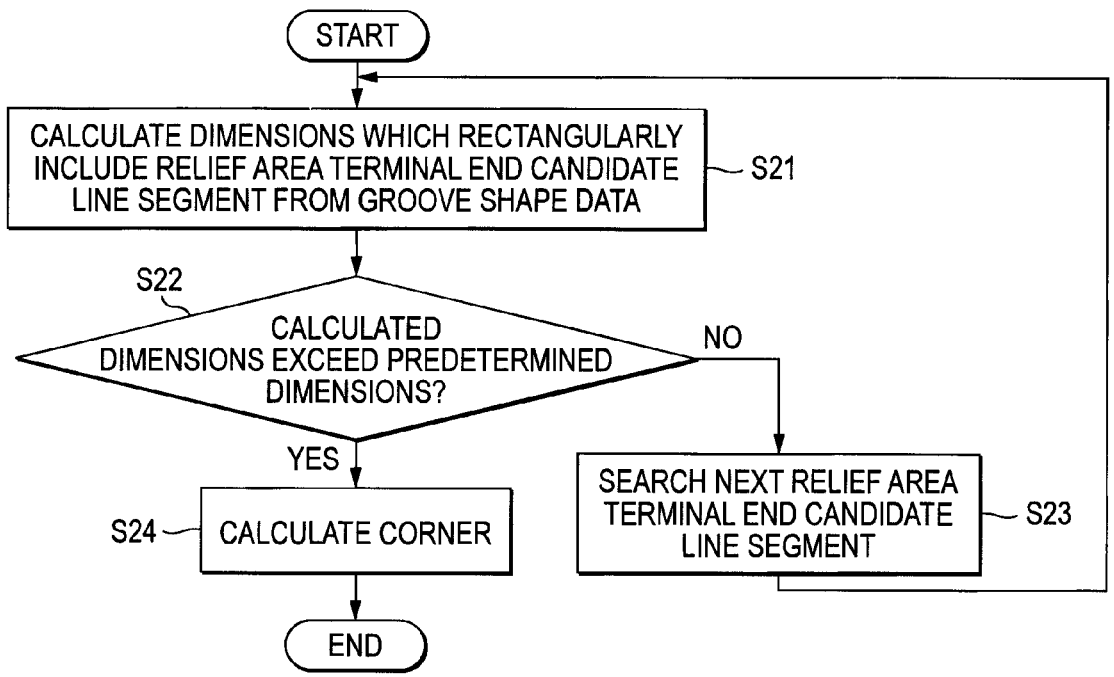
FIG. 5 is a flowchart showing in detail the operation of step S2 in FIG. 4.
Figure 6:
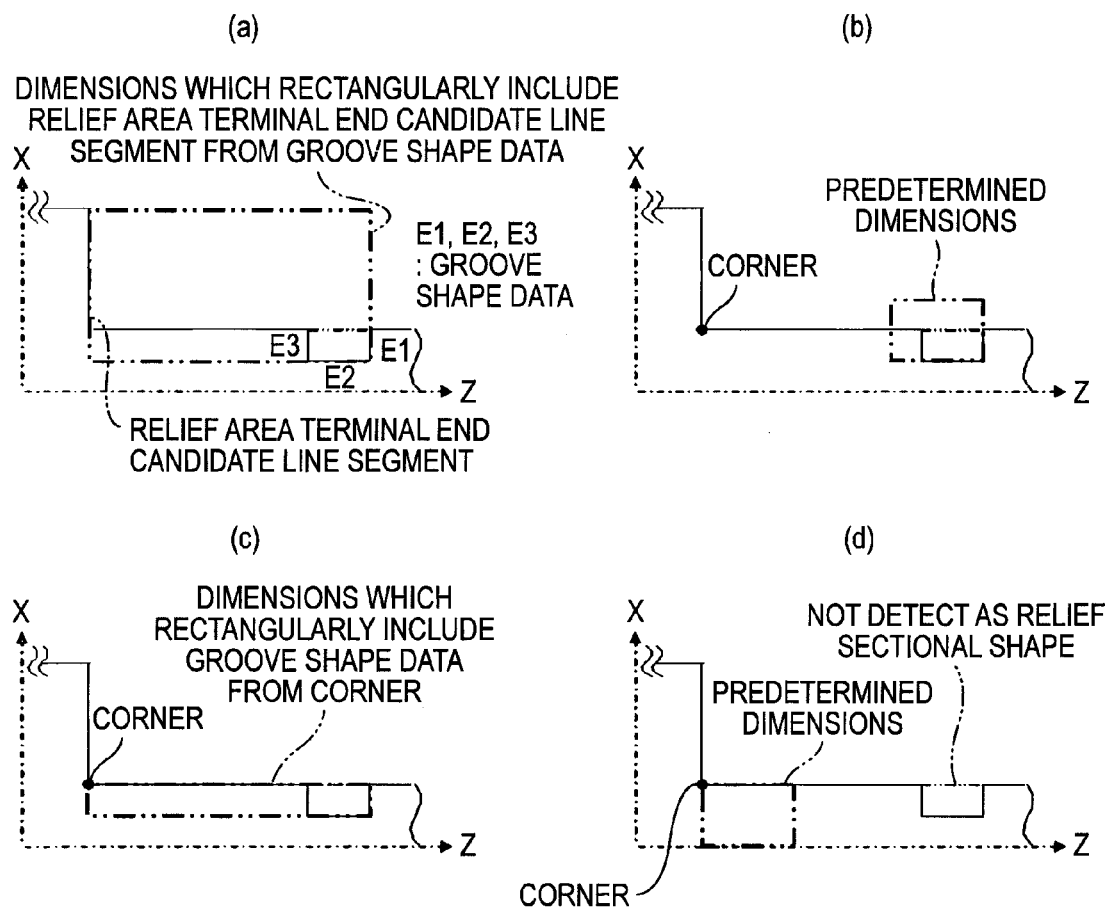
FIG. 6 is a view showing an example of description of a method of calculating a corner according to Embodiment 1 of the invention.
Figure 7:
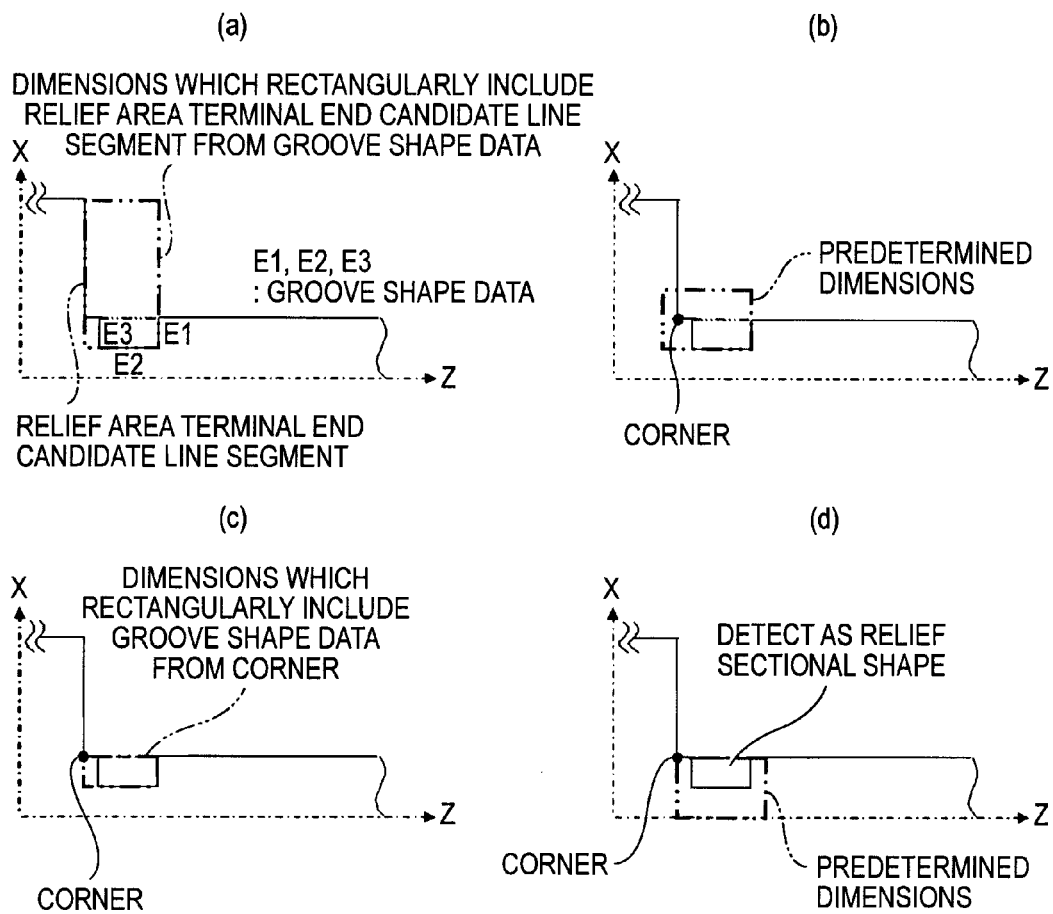
FIG. 7 is a view showing another example of description of the method of calculating a corner according to Embodiment 1 of the invention.
Figure 8:
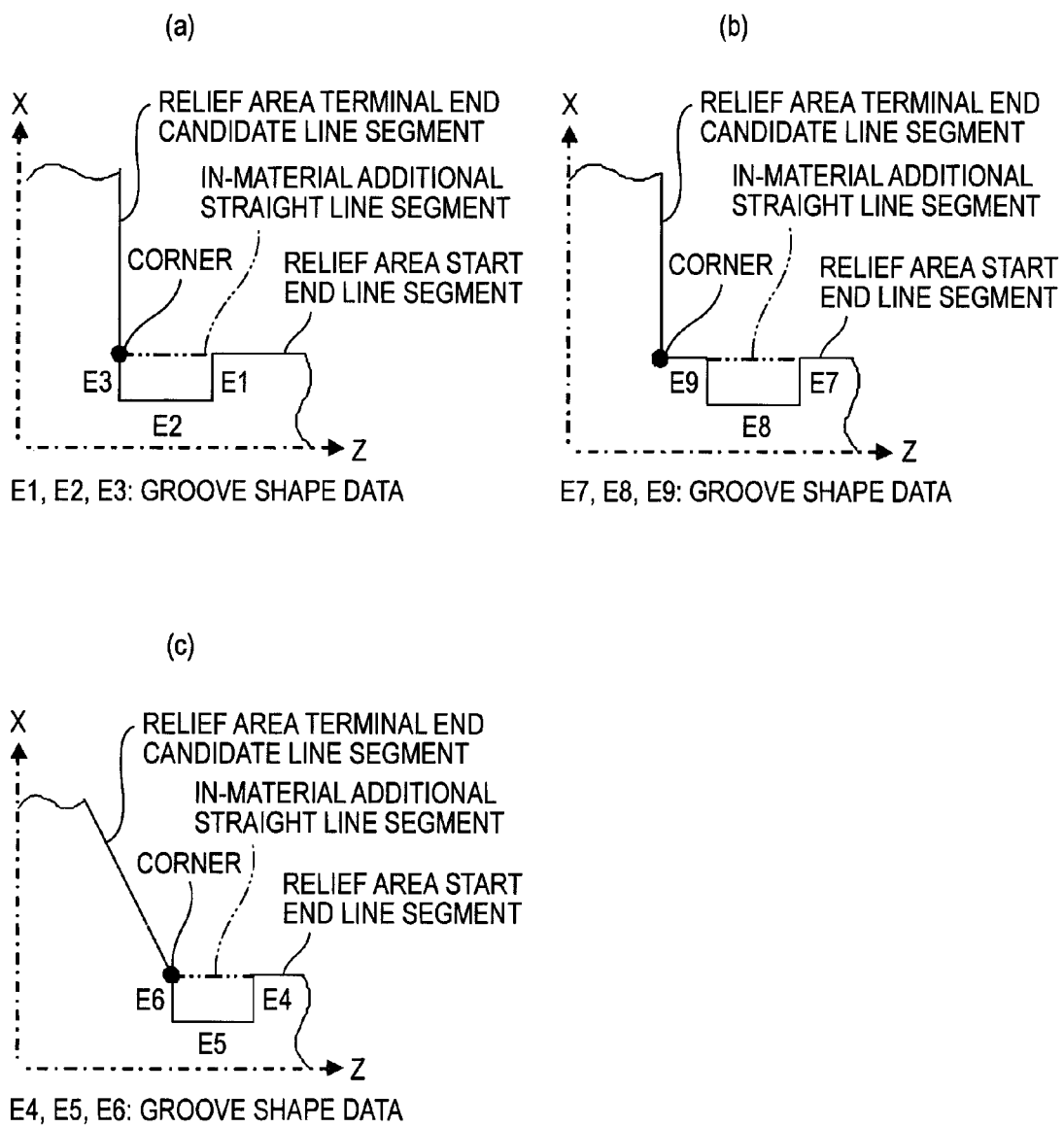
FIG. 8 is a view illustrating in detail the method of calculating a corner according to Embodiment 1 of the invention.

FIG. 5 is a flowchart showing in detail the portion where "a corner is calculated from groove shape data" in step S2 in FIG. 4, FIG. 6 is a view illustrating a method of calculating a corner in a case where the groove shape is in a location considerably separated from a next rising line segment (relief area terminal end candidate line segment) of the groove shape (a case where the shape is not eventually recognized as a relief sectional shape), FIG. 7 is a view illustrating the method of calculating a corner in a case where the groove shape exists at a short distance from the next rising line segment (relief area terminal end candidate line segment) of the groove shape (a case where the shape is eventually recognized as a relief sectional shape), and FIG. 8 is a view illustrating in detail the method of calculating a corner.

In step S21 of FIG. 5, namely, dimensions which rectangularly include the relief area terminal end candidate line segment are calculated from the groove shape data as shown in FIGS. 6(a) and 7(a). In a case where, as shown in FIG. 6, the groove shape of E1, E2, E3 exists in a location considerably separated from the next rising line segment (relief area terminal end candidate line segment) of the groove shape, for example, the dimensions indicate the vertical and horizontal dimensions of the rectangle shown by the two-dot chain lines in FIG. 6(a). In a case where, as shown in FIG. 7, the groove shape of E1, E2, E3 exists at a short distance (vicinity) from the next rising line segment (relief area terminal end candidate line segment) of the groove shape, the dimensions indicate the vertical and horizontal dimensions of the rectangle shown by the two-dot chain lines in FIG. 7(a). FIGS. 6(a) and 7(a) show the final results which are obtained by calculating dimensions which rectangularly include the relief area terminal end candidate line segment from the groove shape data.

In step S22, next, it is determined whether the calculated dimensions exceed predetermined dimensions or not. The predetermined dimensions are the vertical and horizontal dimensions of the rectangle (for example, a frame having a width and height of 3 mm) shown by the two-dot chain lines in FIG. 6(b) or 7(b), and stored as relief dimensions 9 in the relief dimension storing section.

If the dimensions which rectangularly include the relief area terminal end candidate line segment from the groove shape data do not exceed the predetermined dimensions, the calculation is repeated while changing the relief area terminal end candidate line segment to the next line segment, until exceeding the predetermined dimensions (step S23). If the dimensions which rectangularly include the relief area terminal end candidate line segment from the groove shape data exceed the predetermined dimensions, the intersection of the straight line (line segment parallel to the turning axis) which is extended from the relief area start end line segment, and a straight line (line segment that is not parallel to the line segment parallel to the turning axis) which is extended from the relief area terminal end candidate line segment is calculated as a corner as shown in FIG. 8(b), in step S24.

FIG. 8(a) shows the method of calculating a corner in a case where the relief area terminal end candidate line segment perpendicularly rises, and the relief sectional shape is adjacent to the corner, and FIG. 8(c) shows the method of calculating a corner in a case where the relief area terminal end candidate line segment is inclined, and the relief sectional shape is adjacent to the corner.

Also in a case of relief shapes shown in FIGS. 10(b), (c), (e), (f), (h), and (i), a corner can be calculated in a similar manner as described above.

As described above, after the corner in the extracted groove shape data is calculated in step S2, the process transfers to step S3 to detect the relief sectional shape from the extracted groove shape data as shown in FIGS. 6, 7, 9, and 10.

Figure 9:
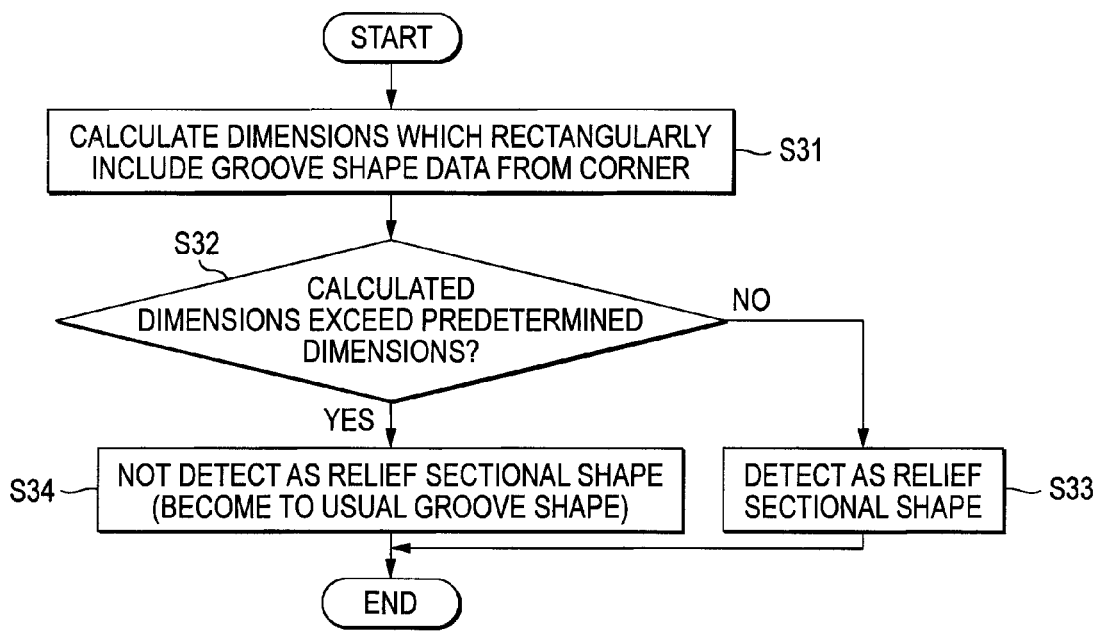
FIG. 9 is a flowchart showing in detail the operation of step S3 in FIG. 4.
Figure 10:
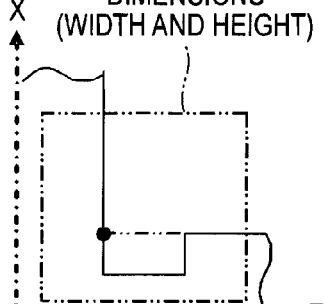
FIG. 10 is a view showing a method of recognizing a relief sectional shape and kinds of the shape according to Embodiment 1 of the invention.
Figure 10:
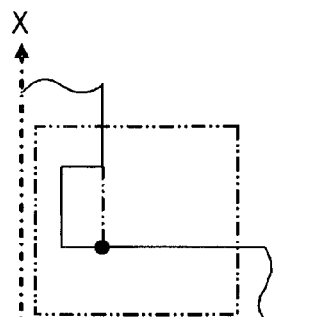
Figure 10:
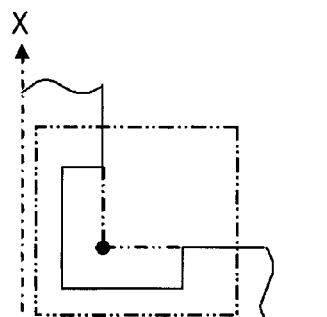
Figure 10:
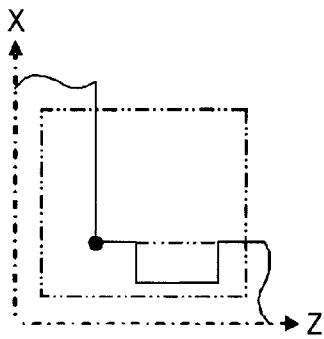
Figure 10:
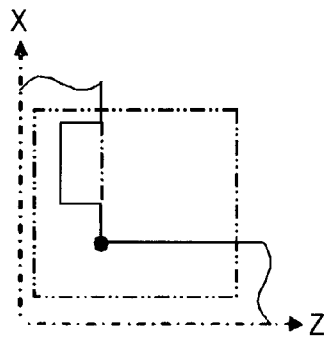
Figure 10:
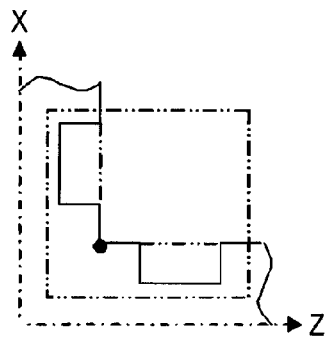
Figure 10:
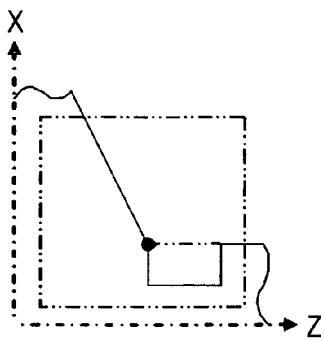
Figure 10:
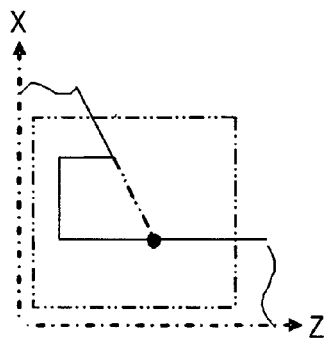
Figure 10:
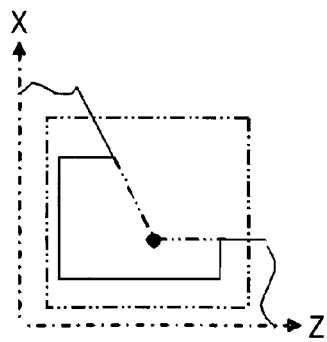

FIG. 6 is a view illustrating a method of detecting the relief sectional shape in a case where the groove shape is in a location considerably separated from the next rising line segment (relief area terminal end candidate line segment) of the groove shape (the case where the shape is not eventually recognized as a relief sectional shape), FIG. 7 is a view illustrating the method of detecting the relief sectional shape in a case where the groove shape exists at a short distance from the next rising line segment (relief area terminal end candidate line segment) of the groove shape (the case where the shape is eventually recognized as a relief sectional shape), FIG. 9 is a flowchart showing in detail step S3 in FIG. 4, and FIG. 10 is a view showing the method of recognizing a relief sectional shape, and examples of recognized relief sectional shapes.

In step S31 in FIG. 9, namely, dimensions which rectangularly include the groove shape data from the corner are calculated as shown in FIGS. 6(c) and 7(c), and, in step S32, it is determined whether the calculated dimensions exceed the predetermined relief dimensions 9 stored in the relief dimension storing section or not. If the calculated dimensions exceed the predetermined relief dimensions 9 as shown in FIG. 6, it is not detected as a relief sectional shape (step S34). If the calculated dimensions do not exceed the predetermined relief dimensions 9 as shown in FIG. 7, it is detected as a relief sectional shape (step S33), and the detected relief sectional shape data 15 are stored together with the calculated corner data in the turning-processing shape data storing section 13 while being separated from the turning sectional shape data 14.

Also in a case of various relief sectional shapes shown in FIG. 10, the relief sectional shape data 15 are detected in a similar manner as described above.

As a result, in a case where groove shape data are connected to the corner as in FIG. 10(a) to (c), and (g) to (i), it is detected as a relief sectional shape, and, even with respect to groove shape data which are separated from the corner as in FIG. 10(d) to (f), it can be detected as a relief sectional shape when the data are within a predetermined range of dimensions.

A rectangular frame is used in order to recognize a relief sectional shape. The frame shape is not limited to a rectangle, but may be any shape as far as it is a shape such as a circular shape which enables a relief sectional shape and a groove shape that is to be processed by a groove tool bit to be recognized separately from each other.

When a relief sectional shape is detected in step S3 as described above, the process transfers to step S4 to determine whether next groove shape data (that are different from the groove shape data on which steps S2 and S3 are executed) exist or not. If next groove shape data exist, the process transfers to step S2 to repeat steps S2 and 3. If next groove shape data do not exist, the process transfers to step S5, and the relief processing program producing section 4 determines whether the relief sectional shape data 15 exist in the turning-processing shape data storing section 13 or not. If the relief sectional shape data 15 do not exist in the turning-processing shape data storing section 13, the process proceeds to step S7, and, if the relief sectional shape data 15 exist in the turning-processing shape data storing section 13, the process proceeds to step S6.

Figure 11:
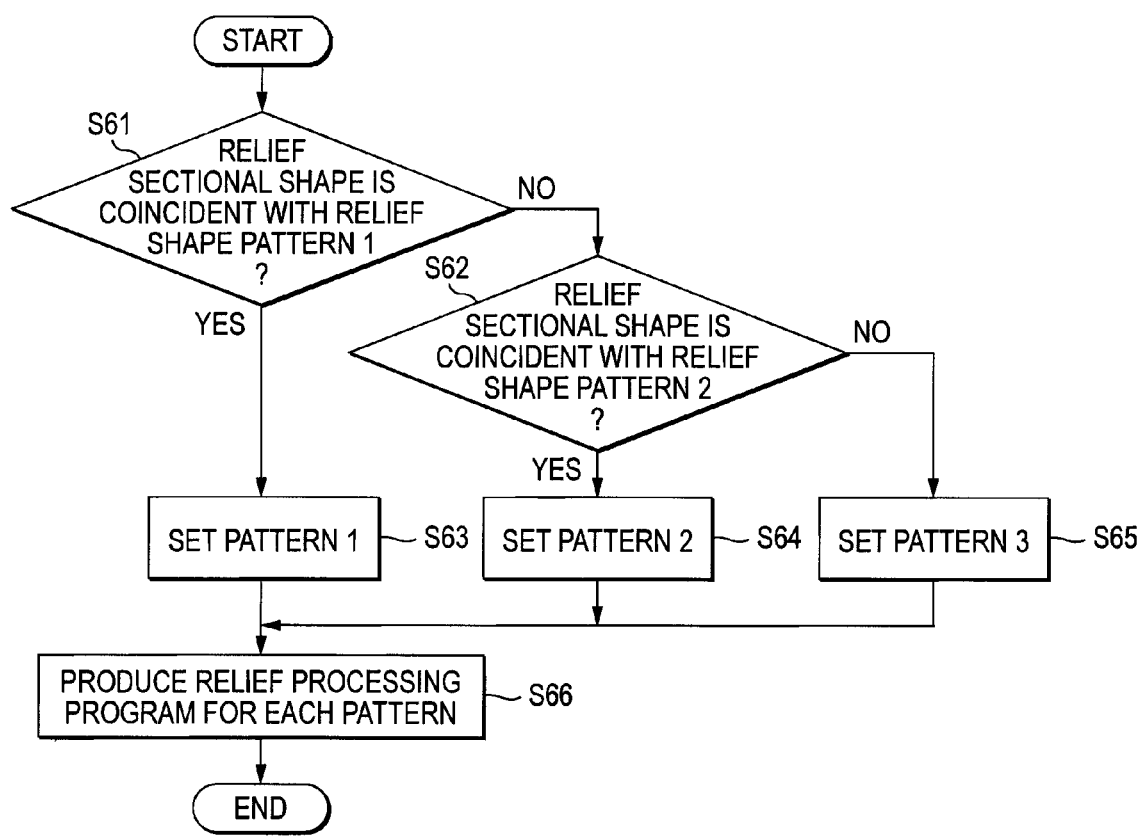
FIG. 11 is a flowchart showing in detail the operation of step S6 in FIG. 4.
Figure 12:
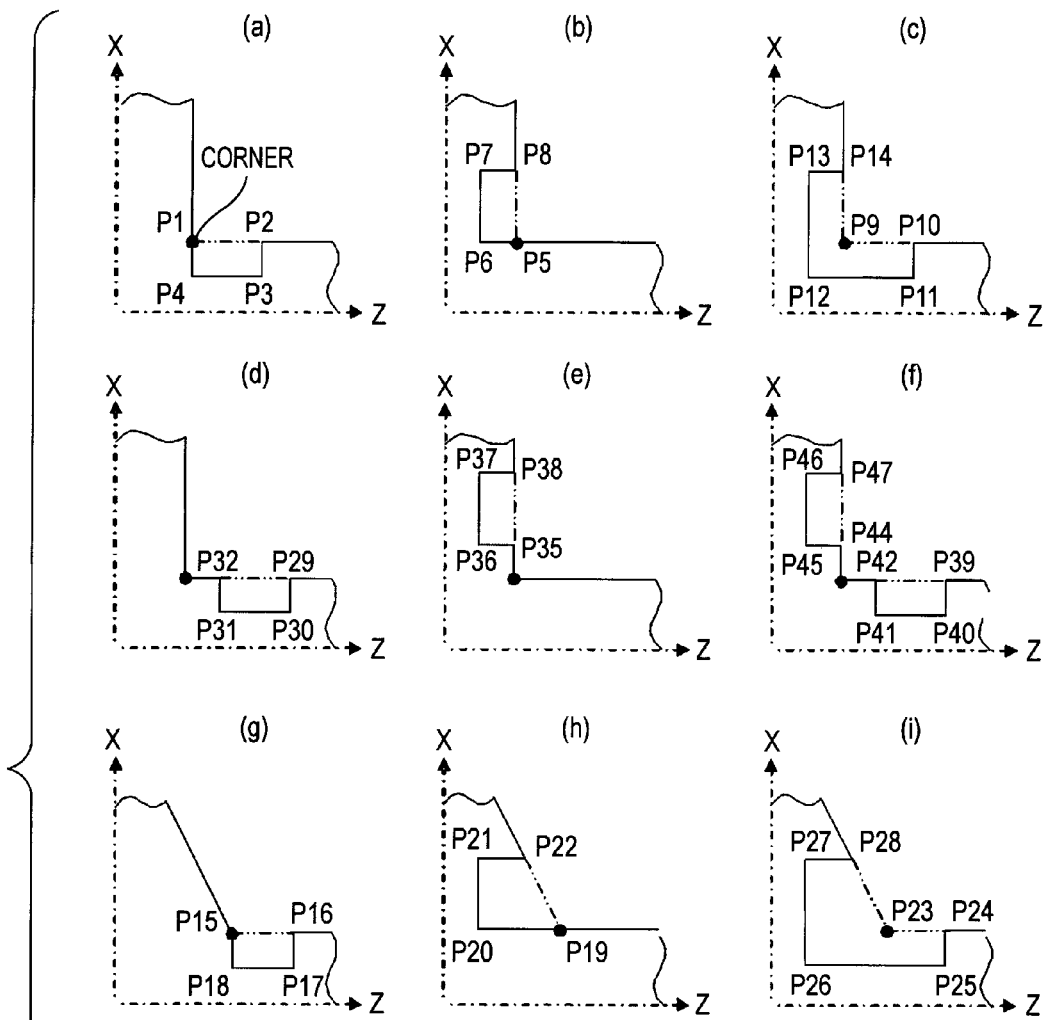
FIG. 12 is a view showing kinds of the relief shape pattern and conditions for determining the pattern according to Embodiment 1 of the invention.
Figure 13:
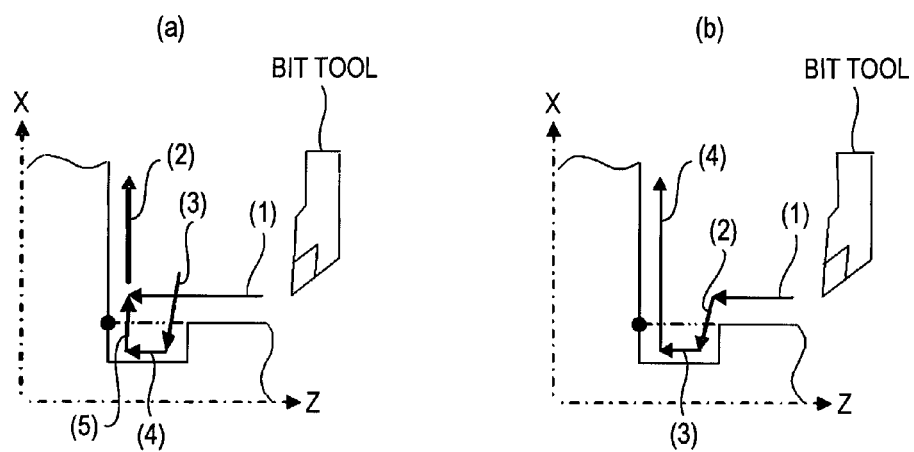
FIG. 13 is a view illustrating a difference of processing paths in cases where a relief processing program according to Embodiment 1 of the invention, and a turning-processing program are not correlated with each other, and where the programs are correlated with each other.
Figure 14:
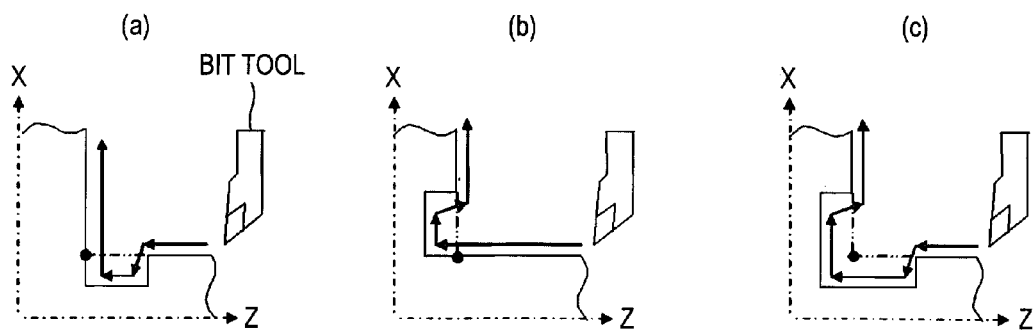
FIG. 14 is a view illustrating processing paths according to the relief shape pattern according to Embodiment 1 of the invention.

In step S6, the relief processing program producing section 4 and the relief shape pattern determining section 5 produce the relief processing program with respect to the relief sectional shape data 15 in accordance with the flowchart of FIG. 11. If, in step S61, the relief sectional shape is determined to be coincident with Relief shape pattern 1 based on relief shape pattern discrimination conditions which will be described later, the relief shape pattern determining section 5 sets Pattern 1 (step S63). If not coincident, the process proceeds to step S62, and, if coincident with Relief shape pattern 2, Pattern 2 is set (step S64). If not coincident, the pattern is Pattern 3, and therefore Pattern 3 is set (step S65). In step S66, the relief processing program producing section 4 produces the relief processing program 18 for each set pattern, and stores the program in the turning-processing program storing section 16.

The relief shape pattern is classified into a relief sectional shape (Pattern 1) which is connected to the relief area start end line segment, such as FIGS. 12(a), (d), (g), a relief sectional shape (Pattern 2) which is connected to the relief area terminal end candidate line segment, such as FIGS. 12(b), (e), (h), and a relief sectional shape (Pattern 3) which is connected to the relief area start end line segment and the relief area terminal end candidate line segment, such as FIGS. 12(c), (f), (i).

A condition for determining a relief shape pattern is a positional relationship between the coordinate values of the four corners of a rectangle including the relief sectional shape, and the corner where the relief sectional shape exists. As shown in FIG. 12(j), Pattern 1 is allocated in a case where a relief sectional shape of P1, P2, P3, and P4 (P29 to P32, P15 to P18) is located equal to or smaller than the corner in the X direction, and located equal to or larger than the corner in the Z direction. Pattern 2 is allocated in a case where a relief sectional shape of P5, P6, P7, and P8 (P35 to P38, P19 to P22) is located equal to or larger than the corner in the X direction, and located equal to or smaller than the corner in the Z direction. Pattern 3 is allocated in a case where a relief sectional shape of P9, P10, P11, P12, P13, and P14 (P39 to P47, P23 to P28) is both located equal to or larger and equal to or smaller than the corner in the X direction, and both equal to or larger and equal to or smaller than the corner in the Z direction.

As a result of the allocation, In a case of the relief sectional shape allocated to Pattern 1 shown in FIGS. 12(a) and (d), the relief processing program 18 in which processing is performed as shown in FIG. 14(a) is produced. Even in a case of a relief sectional shape such as shown in FIG. 12(d), namely, it is assumed that a Z-axis direction portion between the groove shape and the corner (the portion between the point P32 and the corner in FIG. 12(d)) does not exist, and the relief processing program 18 is produced in which processing paths that are similar to the case of the relief sectional shape shown in FIG. 12(a) are generated. In FIG. 14(a), in a case of the relief sectional shape shown in FIG. 12(g), processing paths similar to those for the relief sectional shape shown in FIG. 12(a) are generated except that another path for inclinedly processing a relief area terminal end candidate component place is generated.

In a case of the relief sectional shape allocated to Pattern 2 shown in FIGS. 12(b) and (e), the relief processing program 18 in which processing is performed as shown in FIG. 14(b) is produced. Even in a case of a relief sectional shape such as shown in FIG. 12(e), namely, it is assumed that an X-axis direction portion between the groove shape and the corner (the portion between the point P35 and the corner in FIG. 12(e)) does not exist, and the relief processing program 18 is produced in which processing paths that are similar to the case of the relief sectional shape shown in FIG. 12(b) are generated. In FIG. 14(b), in a case of the relief sectional shape shown in FIG. 12(h), processing paths similar to those for the relief sectional shape shown in FIG. 12(b) are generated except that another path for inclinedly processing a relief area terminal end candidate component place is generated.

In a case of the relief sectional shape allocated to Pattern 3 shown in FIGS. 12(c) and (f), the relief processing program 18 in which processing is performed as shown in FIG. 14(c) is produced. Even in a case of a relief sectional shape such as shown in FIG. 12(f), namely, it is assumed that an X-axis direction portion between the groove shape and the corner (the portion between the point P44 and the corner in FIG. 12(f)), and a Y-axis direction portion between the groove shape and the corner (the portion between the point P42 and the corner in FIG. 12(f)) do not exist, and the relief processing program 18 is produced in which processing paths that are similar to the case of the relief sectional shape shown in FIG. 12(c) are generated. In FIG. 14(c), in a case of the relief sectional shape shown in FIG. 12(i), processing paths similar to those for the relief sectional shape shown in FIG. 12(c) are generated except that a path for inclinedly processing relief area terminal end candidate component place is generated.

As described above, in step S6, the relief processing program 18 is produced, and, in step S7, the turning-processing program producing section 3 produces the turning-processing program 17 with respect to the turning sectional shape data 14 based on the processing method data 10 and the tool data 11, and stores the program in the turning-processing program storing section 16.

In step S8, the numerical control program producing section 6 produces one numerical control program 19 in consideration of the processing sequence, from the turning-processing program 17 and relief processing program 18 which are produced in steps S6 and S7, and stores the program in the numerical control program storing section. In a case where there is the turning-processing program 17 correlated with the relief processing program 18 which is produced in step S6, as described above by referring to FIG. 13, the numerical control program 19 is produced so that locations other than the relief processing location are turning-processed by the same process tool through the turning-processing program 17, and the relief processing location is cut through the relief processing program 18, and the processing is continuously performed.

In step S9, the numerical control program is analyzed, and tool cut paths are produced.

As apparent form the above description, according to Embodiment 1, groove shape data which cannot be conventionally recognized as a relief, and which exist in the vicinity of a corner can be recognized as a relief sectional shape.

Also a relief processing program pattern can be automatically selected from a plurality of types, and output to a numerical control program.

Embodiment 2

In Embodiment 1, positional relationships between the coordinate values of the four corners of a rectangle including a relief sectional shape, and the corner where the relief sectional shape exists are set as the conditions for determining the relief shape pattern. The determination can be realized also by using a method in which determination is performed depending on the direction of a vector perpendicular to an in-material additional straight line segment that closes a relief sectional shape. In the embodiment, the method will be described. The types of patterns which are allocated as a result of determination are identical with those in Embodiment 1, and only the determination conditions are different. Therefore, only different portions will be described.

Figure 15:
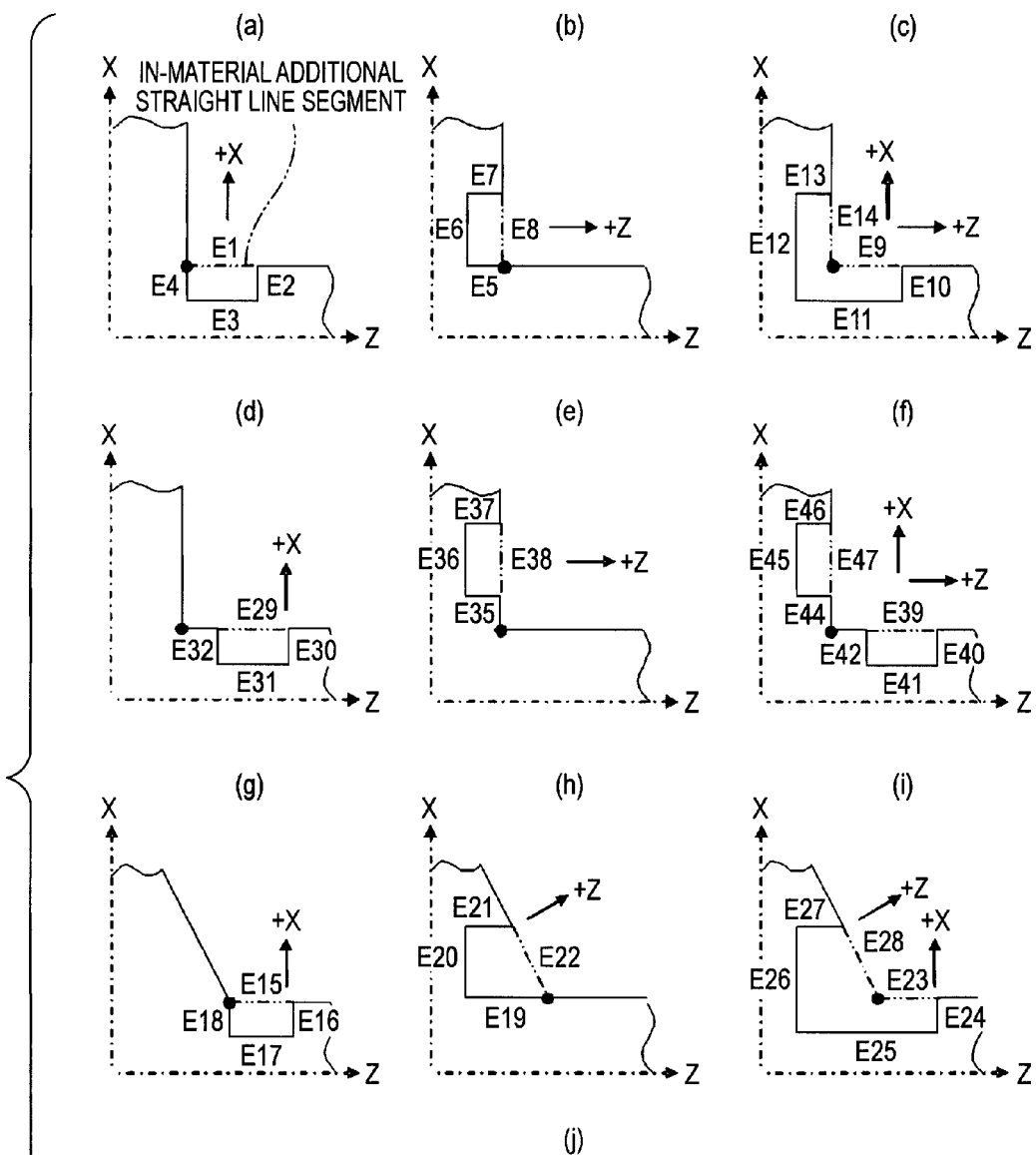
FIG. 15 is a view showing a list of kinds of the relief shape pattern and conditions for determining the pattern according to Embodiment 2 of the invention.

As shown in FIG. 15(j), a vector perpendicular to an in-material additional straight line segment that is indicated by a two-dot chain straight line segment in FIG. 15(a) to (i), and that closes a relief sectional shape is calculated. Pattern 1 is allocated in a case where the vector is in the positive X-direction (FIGS. 15(a), (d), (g)). Pattern 2 is allocated in a case where the vector is in the positive Z-direction (FIG. 15(b), (e), (h)). Pattern 3 is allocated in a case where one of the vectors is in the positive X-direction, and the other of the vectors is in the positive Z-direction (FIG. 15(c), (f), (i)).

INDUSTRIAL APPLICABILITY

The method of generating a numerical control program, apparatus for the same, and program for causing a computer to execute the method of the invention are suitably used for generating a numerical control program for processing a product on which a relief processing is to be performed.

DESCRIPTION OF REFERENCE NUMERALS AND SIGNS

1 Turning-processing shape detecting section, 2 Relief shape determining section, 3 Turning-processing program producing section, 4 Relief processing program producing section, 5 Relief shape pattern determining section, 6 Numerical control program producing section, 7 Controlling section, 8 Sectional shape data, 9 Relief dimensions, 10 Processing method data, 11 Tool data, 12 Relief shape pattern, 13 Turning-processing shape data storing section, 14 Turning sectional shape data, 15 Relief sectional shape data, 16 Turning-processing program storing section, 17 Turning-processing program, 18 Relief processing program, 19 Numerical control program.

The invention claimed is:

1. A method of generating a numerical control program in which, based on sectional shape data of a product to which a relief processing is to be performed, a numerical control program for turning-processing the product is generated, the method comprising:
   extracting, by a processor, groove shape data from the sectional shape data;
   calculating, by a processor, an intersection of a line segment parallel to a turning axis and a line segment that is not parallel to the line segment as a corner of the sectional shape data;
   determining dimensions of a frame from the calculated corner to the groove shape data;
   recognizing the groove shape data as a relief sectional shape in response to the determined dimensions of the frame being within predetermined dimensions such that the extracted groove shape is in a vicinity of the corner without overlapping with the corner;
   determining a relief shape pattern of the recognized relief sectional shape from among a plurality of relief shape patterns which are processed by a turning tool bit based on whether the relief sectional shape is equal to or larger than the corner in at least one direction;
   generating a relief processing program corresponding to the determined relief shape pattern; and
   integrating the relief processing program into the numerical control program for the turning-processing.

2. The method of generating a numerical control program according to claim 1,
   wherein the plurality of relief shape patterns comprise a first shape pattern in which a line segment configuring a groove shape is connected to the line segment parallel to the turning axis, a second shape pattern in which the line segment configuring the groove shape is connected to the line segment that is not parallel to the line segment parallel to the turning axis, and a third shape pattern in which the line segment configuring the groove shape is connected to the line segment parallel to the turning axis and the line segment that is not parallel to the line segment parallel to the turning axis.

3. The method of generating a numerical control program according to claim 1,
   wherein the determination of the relief shape pattern is performed based on a distance of the relief sectional shape to the corner of the sectional shape data.

4. A method of generating a numerical control program according to claim 1,
   wherein the determination of the relief shape pattern is performed based on a direction of a vector perpendicular to an in-material additional straight line segment that closes the relief sectional shape.

5. A non-transitory computer readable medium storing a program for causing a computer to execute a method of generating a numerical control program in which, based on sectional shape data of a product to which a relief processing is to be performed, a numerical control program for turning-processing the product is generated, the method comprising:
   extracting groove shape data from the sectional shape data;
   calculating an intersection of a line segment parallel to a turning axis and a line segment that is not parallel to the line segment as a corner of the sectional shape data;
   recognizing the groove shape data as a relief sectional shape in a case where dimensions of a frame which includes from the corner to the groove shape data are within predetermined dimensions such that the extracted groove shape is in a vicinity of the corner without overlap with the corner;
   determining a relief shape pattern of the recognized relief sectional shape from among a plurality of relief shape patterns which are processed by a turning tool bit based on whether the relief sectional shape is equal to or larger than the corner in at least one direction;

generating a relief processing program corresponding to the determined relief shape pattern; and integrating the relief processing program into the numerical control program for the turning-processing.

6. An apparatus for generating a numerical control program which, based on sectional shape data of a product to which a relief processing is to be performed, generates a numerical control program for turning-processing the product, the apparatus comprising:

a memory configured to store the section shape data of the product; and a processor configured to:

execute a relief shape determining unit which extracts groove shape data from the sectional shape data, wherein the relief shape determining unit calculates an intersection of a line segment parallel to a turning axis and a line segment that is not parallel to the line segment as a corner of the sectional shape data, determines dimensions of a frame from the calculated corner to the groove shape data, and recognizes the groove shape data as a relief sectional shape in response to the determined dimensions of the frame being within predetermined dimensions such that the extracted groove shape is in s vicinity of the corner without overlapping with the corner;

execute a relief shape pattern determining unit which determines a relief shape pattern with respect to the recognized relief sectional shape from among a plurality of relief shape patterns which are processed by a turning too bit based on whether the relief sectional shape is equal to or larger than the corner in at least one direction;

execute a relief processing program producing unit which generates a relief processing program corresponding to the relief shape pattern that is determined by the relief shape pattern determining unit; and integrate the relief processing program into the numerical control program for turning-processing the product.

7. An apparatus for generating a numerical control program according to claim 6, wherein the plurality of relief shape patterns comprise a first shape pattern in which a line segment configuring a groove shape is connected to the line segment parallel to the turning axis, a second shape pattern in which a line segment configuring a groove shape is connected to the line segment that is not parallel to the line segment parallel to the turning axis, and a third shape pattern in which a line segment configuring a groove shape is connected to the line segment parallel to the turning axis and the line segment that is not parallel to the line segment parallel to the turning axis, such that each of the first pattern, the second pattern, and the third pattern includes the relief sectional shape which is within the predetermined distance from the corner and does not overlap the corner and wherein the first pattern, the second pattern, and the third pattern are executed by the turning tool bit.

8. An apparatus for generating a numerical control program according to claim 6, wherein the relief shape pattern determining unit determines the relief shape pattern from a positional relationship of the relief sectional shape with respect to the corner of the sectional shape data.

9. An apparatus for generating a numerical control program according to claim 6, wherein the relief shape pattern determining unit determines the relief shape pattern from a direction of a vector perpendicular to an in-material additional straight line segment that closes the relief sectional shape.

10. The method of generating the numerical control program according to claim 1, further comprising: generating the numerical control program for continuous processing by a turning tool bit by integrating processing of the relief section shape and tuning processing program.

11. The method of generating the numerical control program according to claim 1, wherein the relief section shape comprises shape data in which the extracted groove shape is in the vicinity of the corner without overlap with the corner and comprises shape data in which the extracted groove shape overlaps the corner.

\* \* \* \* \*